May 20, 1952     L. R. PROVOST     2,597,819
GRASS ELEVATOR AND CONTAINER ATTACHMENT FOR LAWN MOWERS
Filed Sept. 29, 1948     3 Sheets-Sheet 3
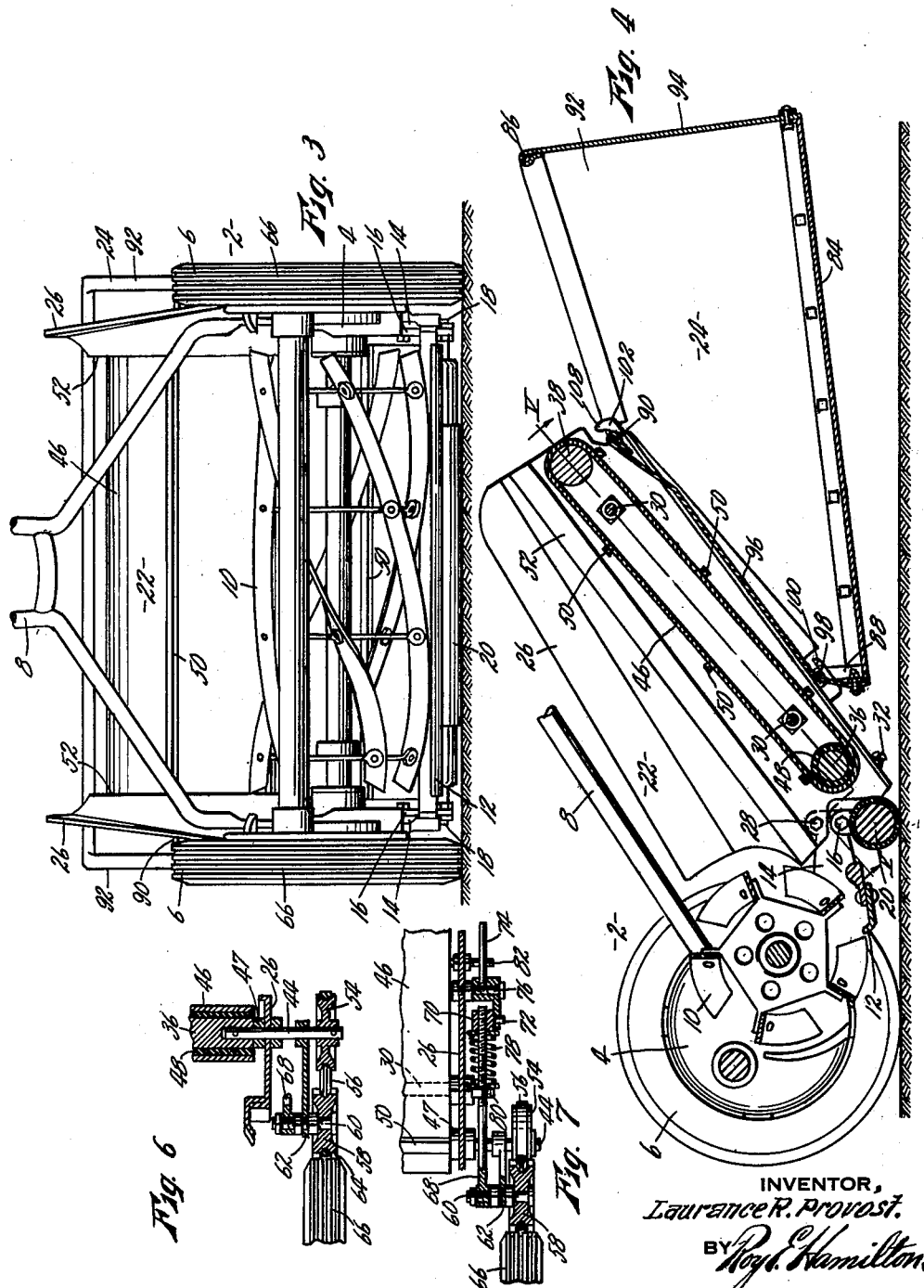
INVENTOR,
*Laurance R. Provost.*
BY *Roy E. Hamilton*
ATTORNEY.

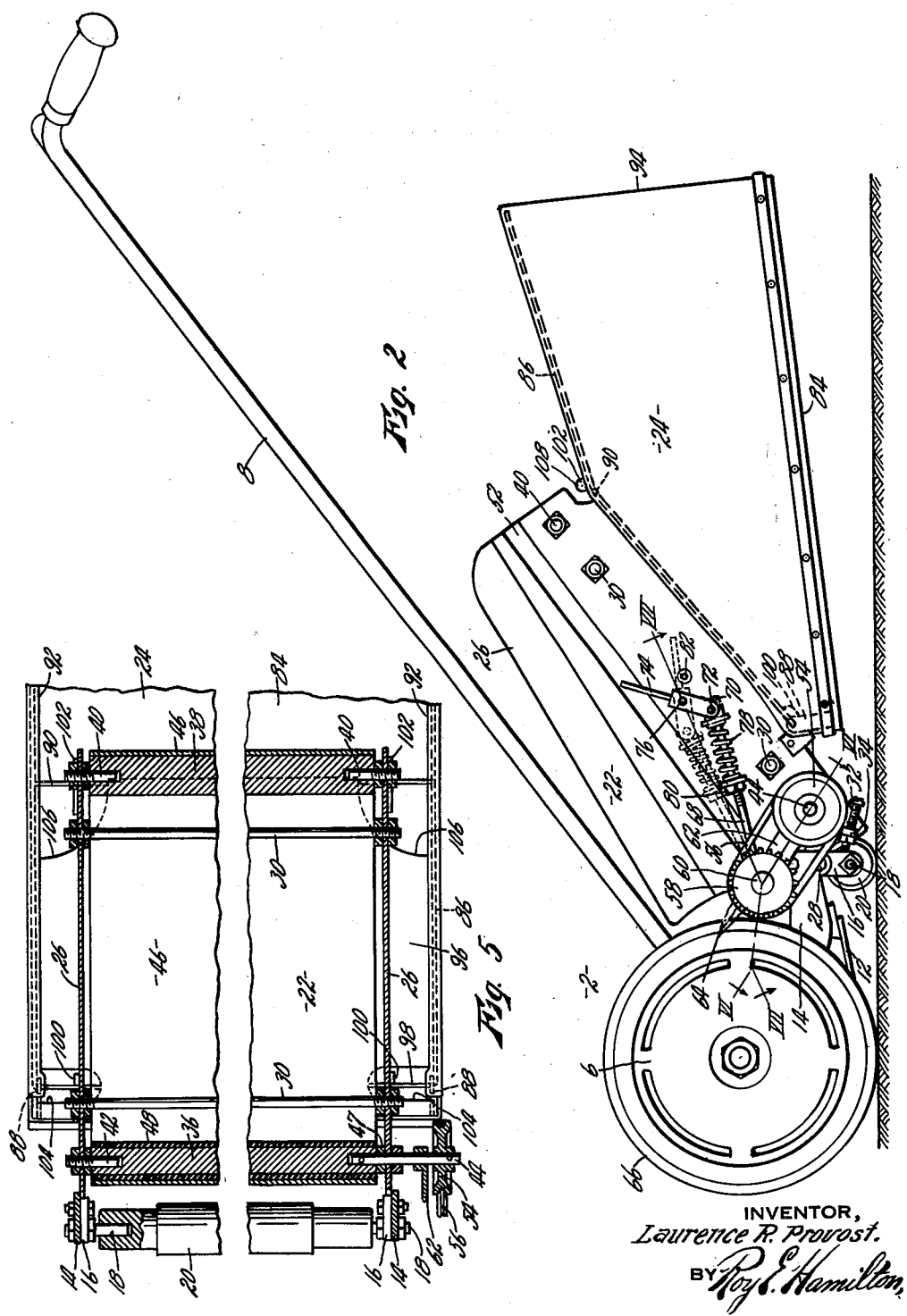

Patented May 20, 1952

2,597,819

UNITED STATES PATENT OFFICE 2,597,819

GRASS ELEVATOR AND CONTAINER ATTACHMENT FOR LAWN MOWERS

Laurence R. Provost, Shawnee, Kans.

Application September 29, 1948, Serial No. 51,791

6 Claims. (Cl. 56—199)

This invention relates to new and useful improvements in grass catchers for lawn mowers, and has as its principal object the provision of a grass catcher attachment for lawn mowers comprising a grass receptacle open at the top, and an elevator conveyor adapted to receive cut grass as it is expelled by said lawn mower, whereby said grass is elevated and deposited in said receptacle.

Another object is the provision of a grass catcher of the character described wherein said elevator conveyor is driven by an operating portion of said lawn mower.

Other objects are simplicity and economy of construction, ease and efficiency of operation, and adaptability to be mounted on various types of lawn mowers.

With these objects in view, as well as other objects which will appear in the course of the specification, reference will be had to the drawing, wherein:

Fig. 2 is a side elevation of the device shown in Fig. 1, with the conveyor clutch mechanism shown in its inoperative position in solid lines and in its operative position in dotted lines.

Fig. 3 is a fragmentary front elevation of the lawn mower and grass catcher attachment.

Fig. 4 is a fragmentary section taken on line IV—IV of Fig. 1.

Fig. 5 is a foreshortened fragmentary sectional view taken on line V—V of Fig. 4, with parts broken away.

Fig. 6 is a fragmentary sectional view taken on line VI—VI of Fig. 2, with parts left in elevation.

Fig. 7 is an irregular fragmentary section taken on line VII—VII of Fig. 2, with parts left in elevation.

Figure 1:
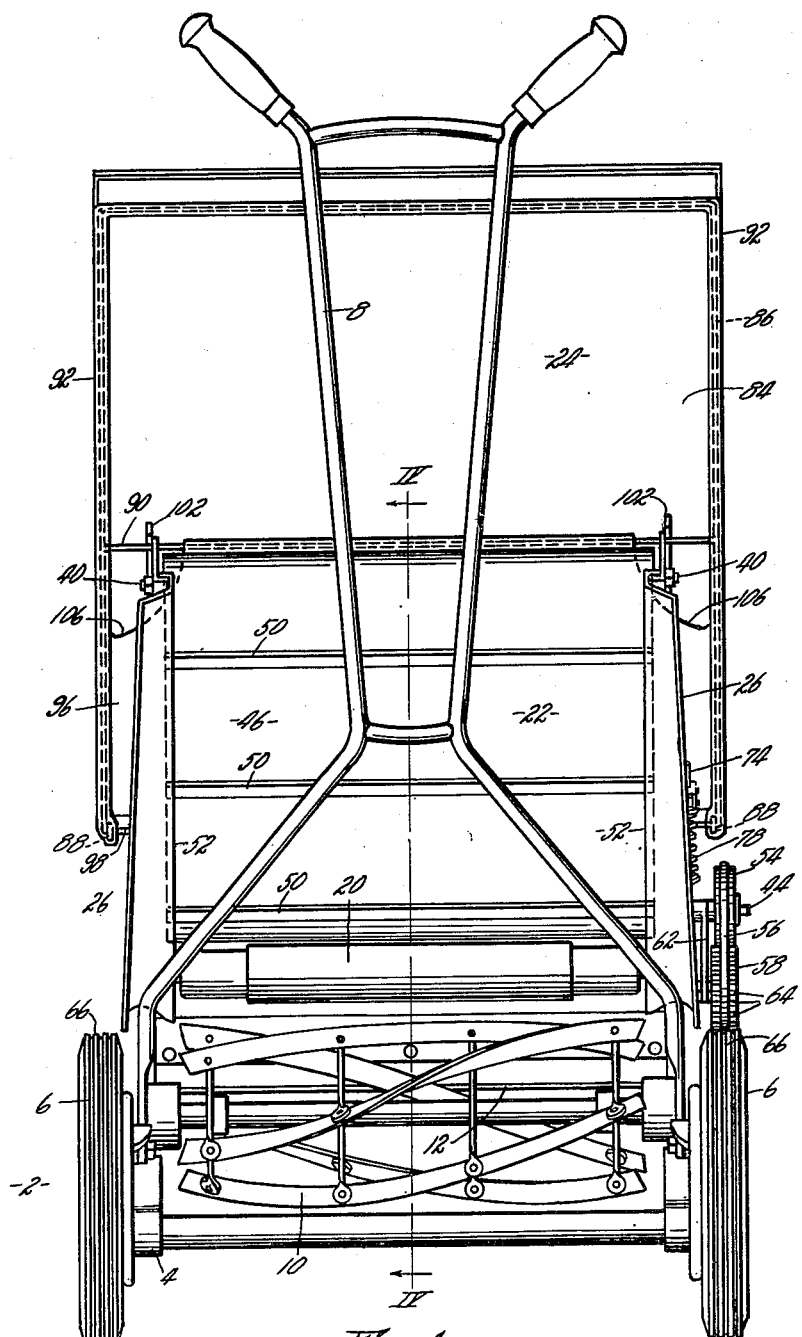
Figure 1 is a plan view of a lawn mower of the hand powered reel type, showing a grass catcher embodying the present invention attached thereto.

Like reference numerals apply to similar parts throughout the several views, and the numeral 2 applies to a hand powered reel type lawn mower of a standard design. It is to be understood, however, that the grass catcher comprising this invention may be attached to various other types of lawn mowers. Said lawn mower comprises essentially a frame 4 supported by ground-engaging wheels 6 and adapted to be manually propelled over the ground by a suitable handle 8. A reel or squirrel cage type blade assembly 10 extends horizontally between wheels 6, being carried rotatably by frame 4 and driven by wheels 6 through suitable gearing not shown. Said reel cooperates with a fixed ledger plate 12 carried rigidly by frame 4 parallel to and adjacent the lower extremity of reel 10 to cut grass as the mower is moved forwardly, and to throw said grass upwardly and rearwardly. Frame 4 is provided adjacent each side of the lawn mower with a rearwardly extending arm 14. Each of said arms carries a bracket 16 rigidly attached thereto, and each of said brackets carries a rigidly mounted, inwardly projecting stub axle 18. Said stub axles are disposed coaxially, and support therebetween for rotation a ground engaging roller 20. The structure so far described is well known in the art.

The grass catcher forming the subject of this invention comprises essentially an elevator conveyor assembly 22 carried by lawn mower frame 4, and a grass receptacle or basket 24 carried by said conveyor assembly. Said conveyor assembly includes a pair of substantially vertical side walls 26 extending upwardly and rearwardly from the lawn mower and respectively pivotally connected adjacent their forward edges to frame arms 14 by means of bolts 28. Said side walls are rigidly connected and spaced apart by a pair of tie rods 30 extending therebetween. Said side walls may be adjustably tilted in a vertical plane about bolts 28 by means of a screw 32 carried adjustably in a bracket 34 fixed to each of said side walls 26 adjacent the lower forward corner thereof, as best shown in Fig. 2. Said screws are adapted to abut against roller brackets 16 to support said side walls at any desired angle. A pair of rollers 36 and 38 are rotatably mounted between side walls 26, being disposed parallel to roller 20 and at right angles to the direction of travel of the lawn mower. Roller 36 is disposed immediately above and behind roller 20, and roller 38 is disposed adjacent the rearward edges of the side walls. Roller 38 is carried for rotation on a pair of coaxial stub axles 40 mounted rigidly in side walls 26. Roller 36 is supported for rotation at one end by a stub axle 42 fixed in one of side walls 26, and is fitted at its opposite end with a rigidly fixed, axially projecting shaft 44. Said shaft is supported for rotation in a bearing member 47 carried by the other of side walls 26, and projects outwardly through said side wall.

An endless belt 46 of fabric, rubber, or other pliable material is disposed about and adapted to be driven by rollers 36 and 38. Roller 36 may be provided with a rubber coating 48 to prevent slippage of said belt. The inclined upper reach of said belt is so disposed as to receive thereon cut grass as it is thrown upwardly and rearwardly by the mower as previously described. Said belt is provided with spaced apart transverse flights 50 for preventing grass from sliding downwardly on the belt surface. Side walls 26 are bent to form inwardly projecting ledges 52 which overlie the edge portions of the belt to prevent grass from falling past the edges of the belt and becoming fouled with rollers 36 and 38.

Belt 46 is driven by means best shown in Figs. 6 and 7. A pulley 54 is rigidly connected to the outwardly extended end portion of shaft 44, and is operatively connected by means of belt 56 with a pulley 58 mounted for rotation on a shaft 60 disposed parallel to shaft 44. Shaft 60 is fixed in an arm 62 pivotally carried on shaft 44, so that pulley 58 moves at all times concentrically about pulley 54. Pulley 58 is provided with a peripheral face considerably broader than belt 58, and lies in the same vertical plane with one of lawn mower wheels 6 so that as pulley wheel 58 is rotated about shaft 44, it will engage the edge of wheel 6 and be driven thereby. It will be noted that belt 56 is recessed beneath the surface of pulley 58, and that the edge portions of the peripheral surface of said pulley are roughened as by transverse grooves 64 to provide efficient frictional contact with wheel 6. In the drawing, wheel 6 is shown equipped with a rubber tire 66, which provides a good frictional driving surface for pulley 58, but it is apparent that a rubber coating on pulley 58, or other suitable means, could be used for this purpose. It is apparent from an analysis of the belt and pulley system above described that as the lawn mower is moved forwardly, the upper reach of belt 46 will be moved upwardly and rearwardly.

Pressure may be applied to urge pulley 58 against wheel 6, thereby providing a clutch for selectively engaging or disengaging the above described conveyor drive system, by means of a mechanism including a push rod 68 pivoted at one end on shaft 60 and extending rearwardly for sliding engagement in a sleeve 70 pivoted at 72 to an operating lever 74, said operating lever being pivoted at 76 to side wall 26. A compression spring 78 is disposed about push rod 68 between a nut 80 carried on said push rod and sleeve 70. When lever 74 and push rod 68 are in angled relation as shown in solid lines in Fig. 2, spring 78 is expanded. When the rearward end of lever 74 is pivoted downwardly to bring said lever into alignment with rod 68, spring 78 is compressed, and functions to urge rod 68 forwardly to pivot arm 62 forwardly, thus urging pulley 58 firmly against wheel 6. A stop pin 82 fixed to side wall 26 serves to limit the downward movement of lever 74 after said lever has moved slightly past its dead center position. Spring 78 also serves to compensate for the varying distance between pivot 76 and wheel 6 caused by adjusting the tilt of the conveyor by operation of screws 32.

Basket 24 comprises a rigid floor member 84, a substantially rectangular wire frame 86 pivoted at its forward end to brackets 88 fixed to said floor member and having a cross wire 90 extending thereacross intermediate its forward and rearward ends, pliable side walls 92 and rear wall 94 of fabric or other suitable material secured at their lower edges to floor 84 and at their upper edges to wire frame 86, and a pliable wall 96 secured at its lower edge to the forward edge of floor 84, and extending upwardly over the forward reach 98 of frame 86 and thence upwardly and rearwardly, being attached at its rearward edge to cross wire 90. The basket is thus open only at the top, and has a much greater capacity than ordinary grass catchers having one side entirely open.

Said basket is removably mounted on the conveyor assembly by means of rearwardly opening hooks 100 rigidly mounted on side walls 26 and adapted to engage forward reach 98 of basket frame 86, and by hooks 102 fixed to the lower edges of side walls 26 at the rearward ends thereof and adapted to engage cross wire 90 of basket frame 86. Pliable wall 96 of the basket is cut away as at 104 and 106 respectively to permit hooks 100 and 102 to engage wires 98 and 90. Hooks 102 are each provided with an upwardly projecting tang 108 adapted to prevent wire 90 from being dislodged therefrom by any rearward force on the basket. The basket may be quickly removed for emptying grass therefrom by first lifting wire 90 over tangs 108 of hooks 102, then moving the basket rearwardly to disengage wire 98 from hooks 100. It will be noted that cross wire 90 is disposed substantially beneath roller 38, so that grass deposited on conveyor belt 46 by the lawnmower as previously described will be elevated by said belt and dropped into the open top of the basket.

It will be noted that basket 24 may be folded to a substantially flat shape when not in use by pivoting frame 86 downwardly, thus collapsing the pliable walls 92 and 94. However, it is apparent that any receptacle capable of being positioned in proper relation to conveyor 46 could be used. It is also contemplated that various other driving connections between the conveyor and an operating portion of the lawn mower could be used. These and other minor variations of design and operation could be made without departing from the spirit of the invention.

What I claim is:

1. The combination, with a lawn mower having a frame supported by ground-engaging wheels and adapted to expel cuttings upwardly and rearwardly therefrom, of a grass catcher including a conveyor assembly comprising a pair of spaced apart side walls attached to said frame and extending rearwardly therefrom, an endless conveyor belt carried between said side walls and having an upper reach adapted to move upwardly and rearwardly, an open-topped receptacle carried by said side walls and having the top opening thereof disposed substantially beneath the rearward end of said upper belt reach, and means carried by said side walls for operatively interconnecting said conveyor belt with one of said ground-engaging wheels, whereby said belt is driven to elevate and deposit in said receptacle cuttings deposited thereon by said lawn mower.

2. The combination, with a lawn mower having a frame supported by ground-engaging wheels and adapted to expel cuttings upwardly and rearwardly therefrom, of a grass catcher including a conveyor assembly comprising a pair of spaced apart side walls pivotally attached adjacent their forward ends to said frame and extending upwardly and rearwardly therefrom, an endless conveyor belt carried between said side walls and having its upper reach inclined upwardly and rearwardly, means for adjusting the angle of inclination of said side walls relative to said frame to adjust the inclination of said upper belt reach, an open-topped receptacle removably attached to said side walls and having the top opening thereof disposed substantially beneath the rearward end of said upper belt reach, and means carried by said side walls for operatively interconnecting said conveyor belt with one of said ground-engaging wheels, whereby as said lawn mower is moved forwardly said belt is driven to elevate and deposit in said receptacle cuttings deposited thereon by said law mower.

3. The combination with a lawn mower having a frame supported by ground-engaging wheels and adapted to expel cuttings upwardly and rearwardly therefrom, of a grass catcher including a conveyor assembly comprising a pair of spaced apart side walls attached to said frame and extending rearwardly therefrom, an endless conveyor belt carried between said side walls and having an upper reach adapted to move upwardly and rearwardly, an open-topped receptacle carried by said side walls and having the top opening thereof disposed substantially beneath the rearward end of said upper belt reach, means carried by said side walls for operatively interconnecting said conveyor belt with one of said ground-engaging wheels whereby said belt is driven to elevate and deposit in said receptacle cuttings deposited thereon by said lawn mower, and means for selectively engaging and disengaging said driving connection.

4. The combination, with a lawn mower having a frame supported by ground-engaging wheels and adapted to expel cuttings upwardly and rearwardly therefrom, of a grass catcher including a conveyor assembly comprising a pair of spaced apart side walls attached to said frame and extending rearwardly therefrom, a pair of rollers carried by said side walls for rotation on axes transverse to the direction of travel of said lawn mower, an endless conveyor belt carried by said rollers and having an upper reach adapted to move upwardly and rearwardly, an open-topped receptacle removably attached to said side walls and disposed substantially beneath the rearward end of said upper belt reach, a first pulley fixed concentrically with one of said rollers and disposed in the vertical plane of one of said ground-engaging wheels, a second pulley carried for rotation on a shaft parallel to and adapted to be pivoted concentrically about the axis of said first pulley, a belt operatively connecting said pulleys, and resilient means for pivoting said second pulley about said first pulley whereby said second pulley is urged into frictional contact with said ground-engaging wheel, whereby said conveyor belt is driven to elevate cuttings deposited thereon by said lawn mower and to deposit said cuttings in said receptacle.

5. The combination, with a lawn mower adapted to cut grass and to throw the cuttings outwardly therefrom, of an inclined conveyor belt assembly carried by said lawn mower including a conveyor belt driven by said lawn mower, a grass catcher receptacle open at the top attached to said conveyor belt assembly, said conveyor belt being adapted to receive thereon cuttings from said lawn mower and to elevate and deposit said cuttings in said receptacle, and means for adjusting the angle of inclination of said conveyor belt assembly.

6. For use in connection with a lawn mower having a frame supported by ground-engaging wheels and adapted to expel cuttings upwardly and rearwardly therefrom, a grass catcher attachment including a conveyor assembly comprising a pair of spaced apart side walls pivotally attached to said frame on a horizontal axis, an endless conveyor belt carried between said side walls and having an upper reach adapted to move upwardly and rearwardly, an open-topped receptacle carried by said side walls and having the top opening thereof disposed substantially beneath the rearward end of said upper belt reach, a pulley movably carried by said conveyor belt and adapted to drive said conveyor belt, resilient means attached to one of said side walls and adapted to urge said pulley into frictional contact with one of said ground-engaging wheels, said resilient means being disposed in transversely offset relation from said pivotal axis whereby the reactive force thereof urges said grass catcher attachment pivotally about its pivotal axis in one direction and means attached to said side walls for adjusting the angle of inclination of said conveyor assembly, said means including stop members carried for adjustment by said side walls and contacting said frame to support said conveyor assembly against pivotal movement by said resilient means.

LAURENCE R. PROVOST.

REFERENCES CITED

The following references are of record in the file of this patent:

UNITED STATES PATENTS

| Number | Name | Date |
| --- | --- | --- |
| 1,060,283 | Phillips | Apr. 29, 1913 |
| 1,140,526 | Patterson | May 25, 1915 |
| 1,261,702 | Christensen | Apr. 2, 1918 |
| 1,383,178 | Voges | June 28, 1921 |
| 1,619,851 | Coley | Mar. 8, 1927 |
| 1,700,926 | Dykes | Feb. 5, 1929 |
| 2,368,290 | Donald | Jan. 30, 1945 |